July 9, 1963
C. M. HEWETT ETAL
3,096,640
SIMPLE APPARATUS FOR THE DETECTION OF LOW
BOILING HYDROCARBONS BY SPARK-GAP METHOD
Filed Dec. 31, 1959
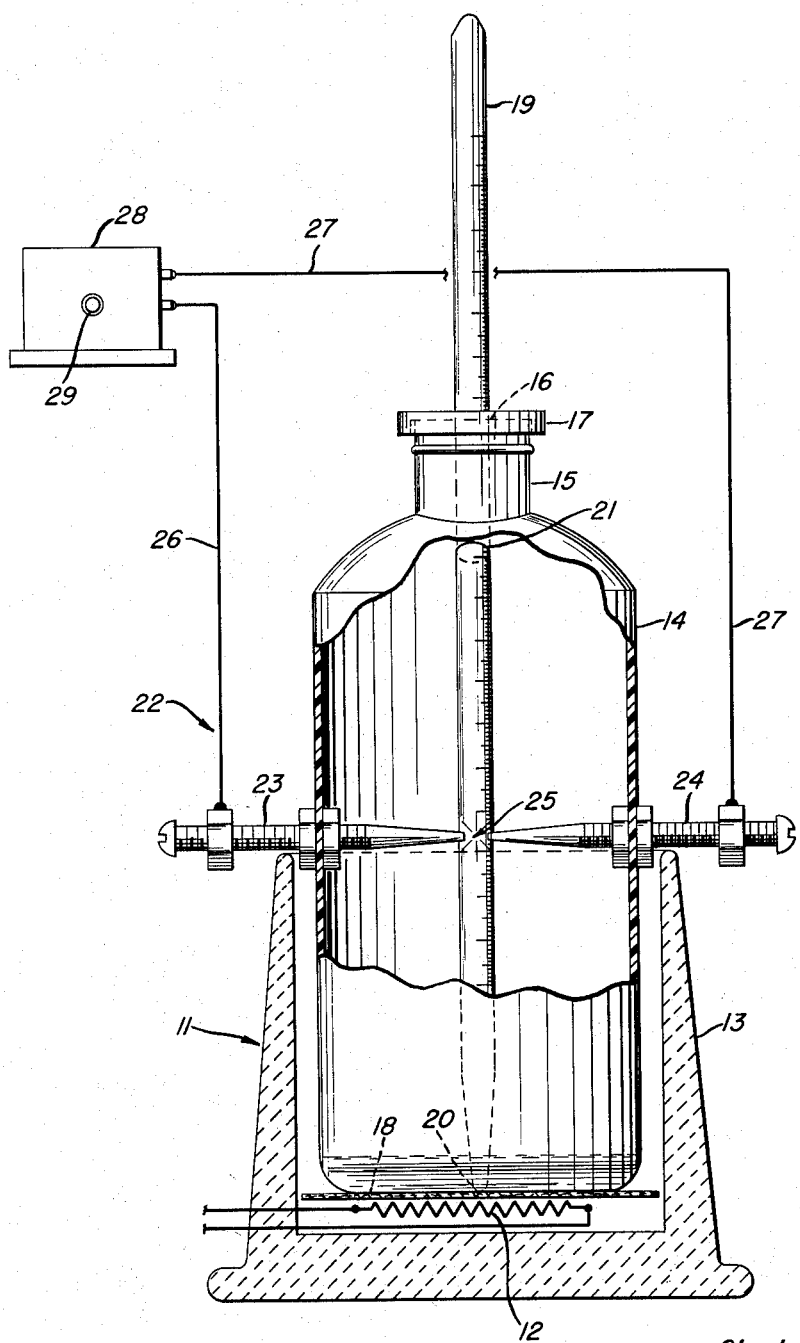
INVENTORS:
Charles M. Hewett
Gordon B. Hamill

United States Patent Office 3,096,640
Patented July 9, 1963

3,096,640
SIMPLE APPARATUS FOR THE DETECTION OF LOW BOILING HYDROCARBONS BY SPARK-GAP METHOD
Charles M. Hewett, Ellicott City, and Gordon B. Hamill, Catonsville, Md., assignors, by mesne assignments, to Standard Oil Company, Chicago, Ill., a corporation of Indiana
Filed Dec. 31, 1959, Ser. No. 863,259
6 Claims. (Cl. 73—36)

This invention relates to a simple apparatus for detecting the presence of low boiling hydrocarbons in a higher boiling liquid hydrocarbon by a spark-gap method.

The need exists for a simple portable apparatus for the detection of easily inflammable higher boiling liquid hydrocarbons. For example, the presence of small amounts of gasolene in kerosene presents a serious hazard. Such contamination may occur at a tank farm, bulk station, service station, or even in the tanks of the consumer. Thus, there are situations where a rapid determination of the presence of such contaminants at the location is necessary; the usual emergency of such a situation prevents the sending of a sample to a laboratory where the contaminants are determined using the usual time-consuming procedures.

An object of the invention is a simple, easily operated apparatus for detecting the presence of low boiling hycarbons in a higher boiling liquid hydrocarbon. Another object is a portable apparatus for detecting gasolene contaminants in petroleum distillates. A particular object of the invention is a simple, easily operated portable apparatus provided with a spark-gap means for detecting the presence of low boiling hydrocarbons in a higher boiling liquid hydrocarbon. Other objects will become apparent in the course of the detailed description of the invention.

The apparatus of the invention comprises means adapted for electrical heating of a bottle adapted for placement on the heating means. The bottle is formed of resilient light transmitting plastic. The mouth of the bottle is covered by a light weight means resting thereon. A means attached for measuring temperatures within and at the bottom of the bottle are provided. And means adapted for providing an electrical discharge gap within the bottle at a substantial distance above the bottom of the bottle are included.

The figure which forms a part of this specification shows one embodiment of the appaartus of the invention.

The invention is described in detail in connection with the figure. It is to be understood that this represents only a specific embodiment and the invention is not limited thereto. In the figure, means adapted for electrical heating 11 consists of a heating element 12 and a tubular body 13. Electrical heater 12 may be a simple hot plate. Tubular body 13 extends upwardly from electrical heater 12 and encompassing a portion of bottle 14. The tubular body 13 may be an asbestos, ceramic or an aluminum cylinder.

Bottle 14 is adapted for placement on heating means 12. Bottle 14 is formed of resilient, light transmitting plastic. Illustrative plastics are polyethylene, polypropylene and Teflon. Bottle 14 is provided with a centrally located neck 15 and a mouth 16.

Mouth 16 is covered by a light-weight means 17 which rests thereon. Herein covering means 17 is a light weight plastic cap suitably made of the same material as bottle 14.

A means is provided for measuring temperature within and at the bottom 18 of bottle 14. Herein the temperature measuring means is a thermometer 19 whose bulb 20 rests on the bottom 18 of bottle 14. The thermometer 19 is inserted into the bottle 14 through an opening 21 in the shoulder of bottle 14. Instead of thermometer 19 a thermocouple or other means for measuring temperature may be used. The apparatus includes a means adapted for providing an electrical discharge gap within the bottle 14 at a substantial distance above the bottom 18. Herein means 22 consists of two electrodes 23 and 24 respectively which electrodes project through the walls of bottle 14 and from a spark-gap 25 therein. Wires 26 and 27 transmit a suitable electrical current from transformer 28 to provide a spark across gap 25. Switch 29 controls the impulse of electrical current from transformer 28.

The operation of the apparatus of the invention is described in connection with a particular embodiment herein: the heater is an automatic baby-bottle warmer made of ceramic materials operating at 110/120 volts A.C. The tubular portion has an inside diameter of 2½ inches and an inside height of 2 inches. The polyethylene bottle is a tapered shoulder, short-necked one of 8 ounce capacity. The outside dimensions are 2¼ inches diameter and 5½ inches high. The inside diameter of the neck is ⅝ inch, and the opening in the shoulder for the thermometer is a ¼ inch diameter circle. The polyethylene cap weighs about 1½ to 2 grams. The cap has an inside diameter of 1 inch and the lip of 5/16 inch.

The electrodes are made of two tapered brass bolts. The length of the bolts is two inches, the diameter is 3/16 inch. The bolts are secured through walls of the chamber by locking nuts inside and outside. The electrodes are positioned exactly opposite each other 2⅛ inches above the bottom of the chamber and regulated to a ⅛ inch to 3/16 inch spark-gap. The ignition transformer has a primary voltage of 110 volts A.C. and secondary voltage rating of 10,000. The secondary current rating is 23 ma. The switch is a high voltage push type on the 110 volt side of the transformer. The lead wires run from transformer to contact points on the rim of heating unit.

The thermometer is an ASTM pour-point thermometer with a range minus 20/220° F., with 2° F. subdivisions, and a length of 8¾ inches.

The test for contamination is carried out by introducing 15 ml. of the liquid hydrocarbon into the bottle; the bottle having first been washed several times with tap water—drying of the bottle is not necesary. The sample must be introduced in a manner that avoids contact with the electrodes. The thermometer is inserted so that the bulb touches the bottom of the bottle.

The presence of gasolene in the sample is indicated by the jiggle of the cap when a spark is applied in the bottle. The degree of jiggle is dependent on the amount of gasolene in the sample and in cases of a large amount of contamination the cap may be blown from the bottle. A kerosene containing as much as 25% gasolene will cause a bright glow in the vicinity of the electrodes when sparked with or without movement of the cap.

After the sample has been introduced into the bottle the bottle is placed in the heating unit and the electrodes connected to the transformer. The indicator cap is placed on the mouth of the bottle. A spark is applied by pushing the switch on the transformer. If the cap does not move the switch is pushed again in 30 seconds and 60 seconds. This procedure is repeated at 5° F. intervals until a temperature of 115° F. is reached unless the cap jiggles at a lower temperature. It has been determined that using this embodiment a temperature of 115° F. corresponds to a temperature of 110° F. using the Pensky-Martin closed cup method. This particular embodiment of the apparatus can be operated up to 160° F. to check on the safety of higher boiling hydrocarbons such as fuel oil.

Thus having described the invention, what is claimed is:
1. A portable apparatus for detecting the presence of low boiling hydrocarbons in a higher boiling liquid hydrocarbon which apparatus comprises: means for electrical heating; a bottle to be heated by said heating means, said bottle being formed of resilient, light-transmitting plastic; light weight cover means for resting on and for covering the mouth of said bottle, said means being capable of movement in response to the exit of gases formed by electrical spark ignition of hydrocarbon vapor in said bottle; means for measuring temperature at the inside bottom of said bottle, means for providing an electrical discharge gap within said bottle at a substantial distance above the bottom of said bottle and means for controllably supplying a suitable electrical current to said spark-gap means.

2. The apparatus of claim 1 wherein said bottle is formed of polyethylene.

3. The apparatus of claim 1 wherein said covering means is a polyethylene cap.

4. The apparatus of claim 1 wherein said temperature measuring means is a thermometer.

5. The apparatus of claim 1 wherein said electrical heating means is provided with a tubular body within which said bottle is positioned.

6. A portable apparatus for detecting the presence of low boiling hydrocarbons in a higher boiling liquid hydrocarbon which apparatus comprises: an electrical heater means provided with a tubular body extending upwardly; a bottle adapted for placement on said heating means and within said tubular body, said bottle being formed of resilient, light-transmitting plastic; a light weight plastic cap adapted to rest on and cover the mouth of said bottle, said cap being capable of movement in response to the exit of gases formed by electrical spark ignition of hydrocarbon vapor in said bottle; a thermometer means for measuring the temperature within and at the bottom of said bottle; a spark-gap means positioned within said bottle at a substantial distance above the bottom of said bottle; and means for controllably supplying a suitable electrical current to said spark-gap means.

References Cited in the file of this patent
UNITED STATES PATENTS

| | | |
|---|---|---|
| 2,627,745 | Matteson | Feb. 10, 1953 |
| 2,682,765 | McCutchan et al. | July 6, 1954 |
| 2,746,286 | Greanias et al. | May 22, 1956 |
| 2,939,312 | Jacobs et al. | June 7, 1960 |